Jan. 9, 1968 MITSUO WADA ETAL 3,362,323

MANUFACTURING APPARATUS OF FLAT TYPE FILM RESISTORS

Filed Aug. 8, 1966 11 Sheets-Sheet 1

INVENTORS
MITSUO WADA
KANJI SUGIHARA
SATORU OSAGAWA

BY Wenderoth, Lind & Ponack

ATTORNEYS

INVENTORS
MITSUO WADA
KANJI SUGIHARA
SATORU OSAGAWA
BY Wenderoth, Lind & Ponack
ATTORNEYS Jan. 9, 1968 MITSUO WADA ETAL 3,362,323

MANUFACTURING APPARATUS OF FLAT TYPE FILM RESISTORS

Filed Aug. 8, 1966 11 Sheets-Sheet 3

INVENTORS
MITSUO WADA
KANJI SUGIHARA
SATORU OSAGAWA

BY Wenderoth, Lind & Ponack

ATTORNEYS

MANUFACTURING APPARATUS OF FLAT TYPE FILM RESISTORS

INVENTORS
MITSUO WADA
KANJI SUGIHARA
SATORU OSAGAWA
BY Wenderoth, Lind & Ponack
ATTORNEYS

MANUFACTURING APPARATUS OF FLAT TYPE FILM RESISTORS

Filed Aug. 8, 1966 11 Sheets-Sheet 5

INVENTORS
MITSUO WADA
KANJI SUGIHARA
SATORU OSAGAWA
BY Wenderoth, Lind & Ponack
ATTORNEYS Jan. 9, 1968 MITSUO WADA ETAL 3,362,323

MANUFACTURING APPARATUS OF FLAT TYPE FILM RESISTORS

Filed Aug. 8, 1966 11 Sheets-Sheet 6

INVENTORS
MITSUO WADA
KANJI SUGIHARA
SATORU OSAGAWA

BY Wenderoth, Lind & Ponack

ATTORNEYS

Jan. 9, 1968 MITSUO WADA ETAL 3,362,323

MANUFACTURING APPARATUS OF FLAT TYPE FILM RESISTORS

Filed Aug. 8, 1966 11 Sheets-Sheet 7

INVENTORS
MITSUO WADA
KANJI SUGIHARA
SATORU OSAGAWA

BY Wenderoth, Lind & Ponack

ATTORNEYS

MANUFACTURING APPARATUS OF FLAT TYPE FILM RESISTORS

Filed Aug. 8, 1966

INVENTORS
MITSUO WADA
KANJI SUGIHARA
SATORU OSAGAWA
BY Wenderoth, Lind & Ponack
ATTORNEYS

MANUFACTURING APPARATUS OF FLAT TYPE FILM RESISTORS

INVENTORS
MITSUO WADA
KANJI SUGIHARA
SATORU OSAGAWA
BY Wenderoth, Lind & Ponack
ATTORNEYS Jan. 9, 1968 MITSUO WADA ET AL 3,362,323

MANUFACTURING APPARATUS OF FLAT TYPE FILM RESISTORS

Filed Aug. 8, 1966 11 Sheets-Sheet 10

INVENTORS
MITSUO WADA
KANJI SUGIHARA
SATORU OSAGAWA

BY Wenderoth, Lind & Ponack

ATTORNEYS

MANUFACTURING APPARATUS OF FLAT TYPE FILM RESISTORS

Filed Aug. 8, 1966 11 Sheets-Sheet 11

INVENTORS
MITSUO WADA
KANJI SUGIHARA
SATORU OSAGAWA
BY Wenderoth, Lind & Ponack
ATTORNEYS United States Patent Office 3,362,323
Patented Jan. 9, 1968

3,362,323
MANUFACTURING APPARATUS OF FLAT TYPE FILM RESISTORS

Mitsuo Wada, Suita-shi, Kanji Sugihara, Hirakata-shi, and Satoru Osagawa, Neyagawa-shi, Japan, assignors to Matsushita Electric Industrial Co., Ltd., Osaka, Japan
Filed Aug. 8, 1966, Ser. No. 571,073
15 Claims. (Cl. 101—2)

This invention relates to a process of manufacturing flat type film resistors which are positioned on substrates of insulating materials and more particularly to a method of printing such flat type film resistors comprising using a rotary offset press system which is automatically controlled during its operation.

Flat type film resistors, such as those having a film of a carbon composition, a metal glaze film, or a decomposited metal film, have been widely used as resistor elements for low and medium power resistors and for volume controllers in radio, TV and other electronic instruments.

There are many ways of making flat type film resistors on insulating material substrates. Conventionally, a printing ink consisting of a powdered resistance material, a binder and a solvent is applied to an insulating substrate by spraying, dipping or stencil screen printing, and the applied printing ink is heated at an appropriate temperature. Among these methods, spraying and dipping methods are widely used in practice. In the spray method, however, there is a drawback in that a large amount of ink is wasted during spraying and the dimensional stability of sprayed resistors is inferior. When the dipping method is used it is difficult to control the electric resistance of the film which is formed because the amount of volatile solvent in the ink varies with the passage of time during dipping and therefore the ink composition varies. In addition, a complicated pattern of printed film resistors cannot be prepared by the dipping method. With the stencil screen printing method it is difficult to produce a smooth surface on the printed film resistors which are to be used for variable resistors.

Therefore, a basic object of this invention is to eliminate these drawbacks and to provide a method which utilizes a rotary offset printing system with an automatic control of the operation thereof for producing at a high production rate flat type film resistors to close tolerances in their electric properties and having a high dimensional stability.

Another object of this invention is to provide a rotary offset printing system which facilitates automatic printing of flat type film resistors having complicated or miniaturized patterns and having a high dimensional stability.

A further object of this invention is to provide a rotary offset printing system adapted to be used for manufacturing flat type film resistors and including a film resistance control device consisting of a resistance inspection device and an ink supply controller which are electrically connected in such a way that said ink supply controller automatically controls the amount of ink supplied so as to produce a predetermined resistance when a deviation in the inspected resistors generates an electric signal at said ink supply controller.

A further object of this invention is to provide a printing system for printing flat type film resistors which is equipped with a resistor surface treating device for smoothing the surface of the printed resistors in order to improve various electrical properties such as rotational life and rotational noise.

A further object of this invention is to provide a priority system for printing flat type film resistors which has an automatic recorder for the electric resistance of the printed resistors which are produced and makes it possible to inspect the resistors carefully during the individual steps of manufacturing.

A still further object of this invention is to provide a printing system for printing flat type film resistors which facilitates an automatic selection of resultant resistors having a predetermined electric resistance after heating them.

These and other objects of this invention will be apparent from the following description and accompanying drawings wherein.

Figure 3A:
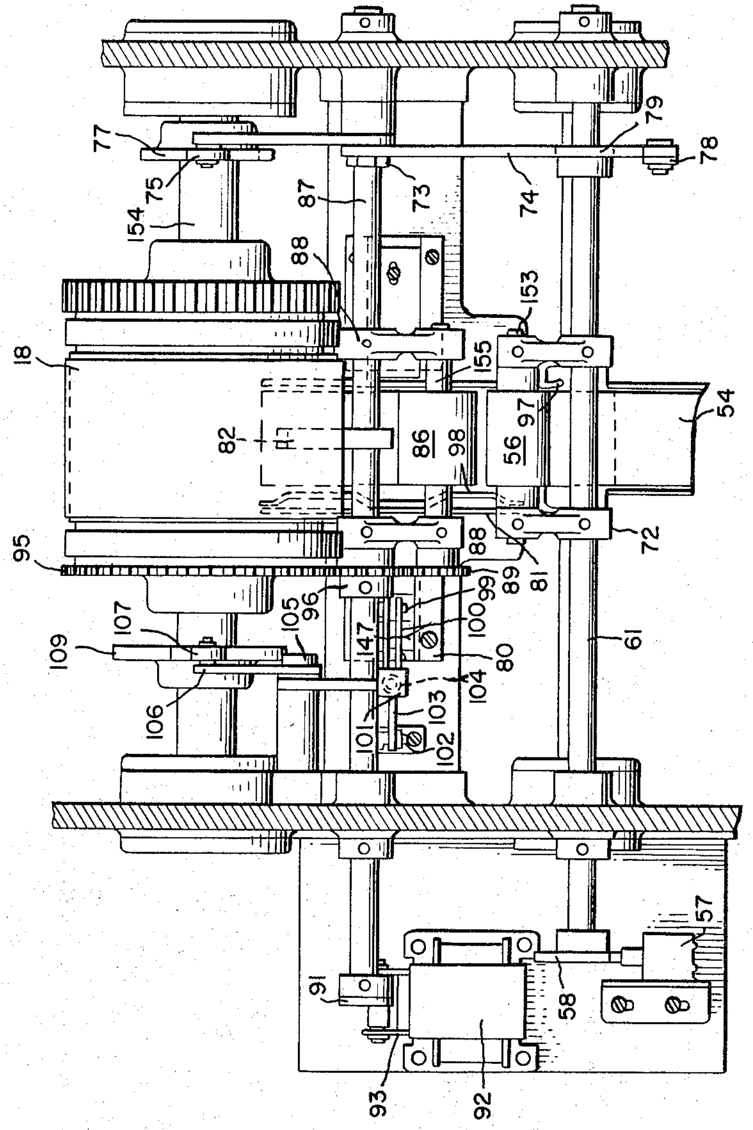
Figure 3B:
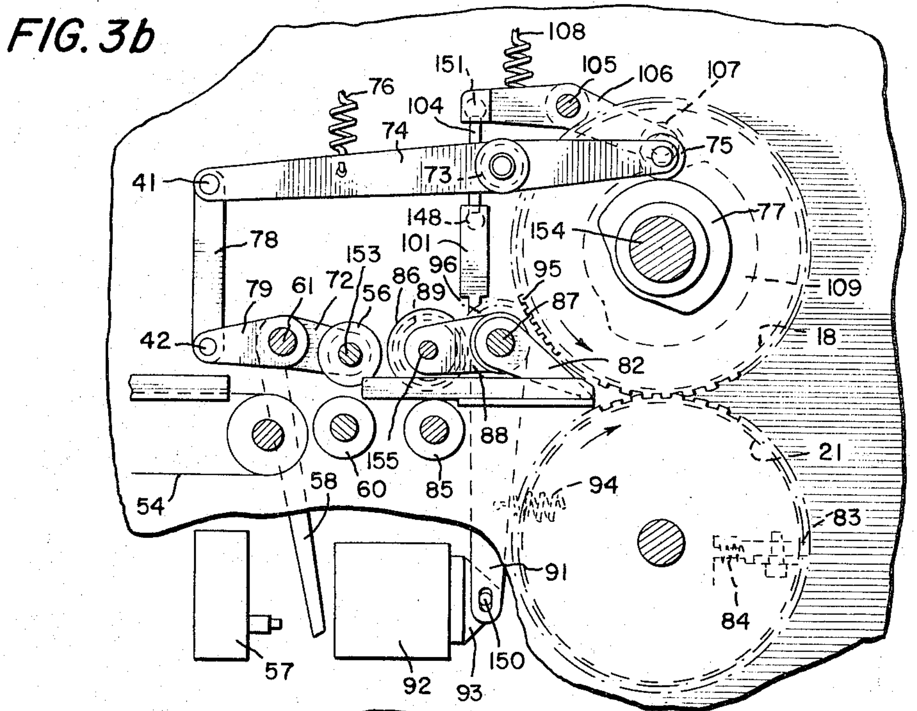
Figure 3C:
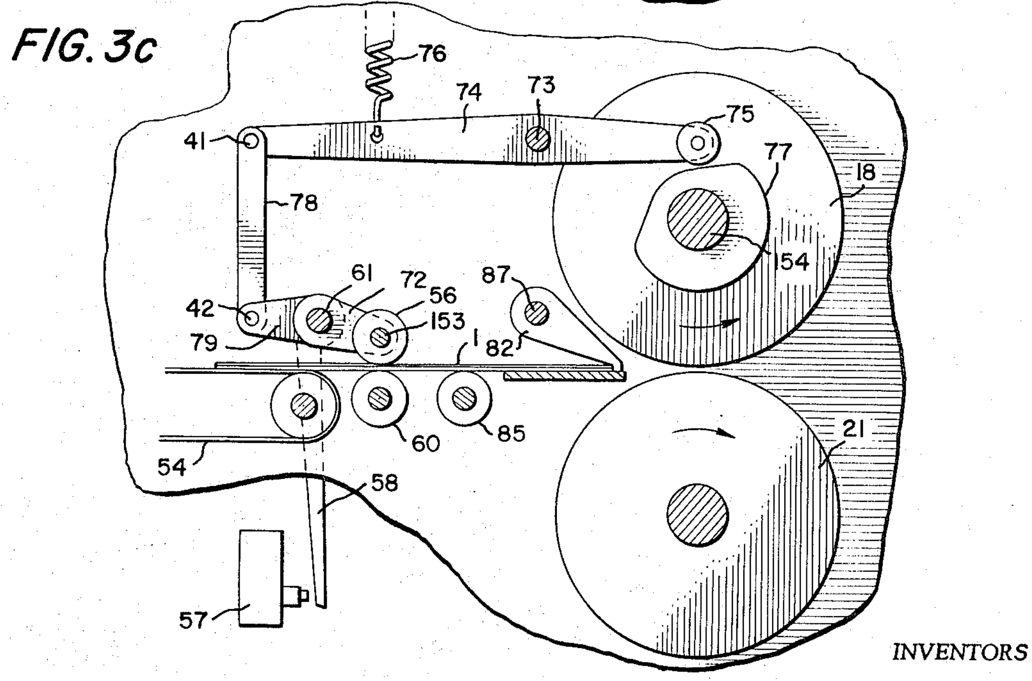
Figure 3D:
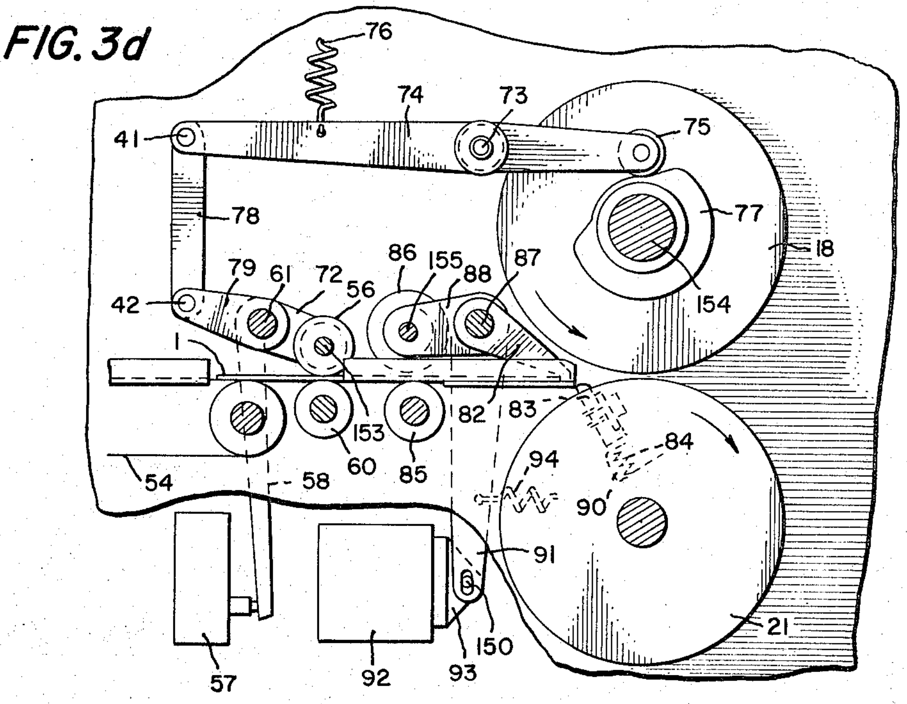
Figure 3E:
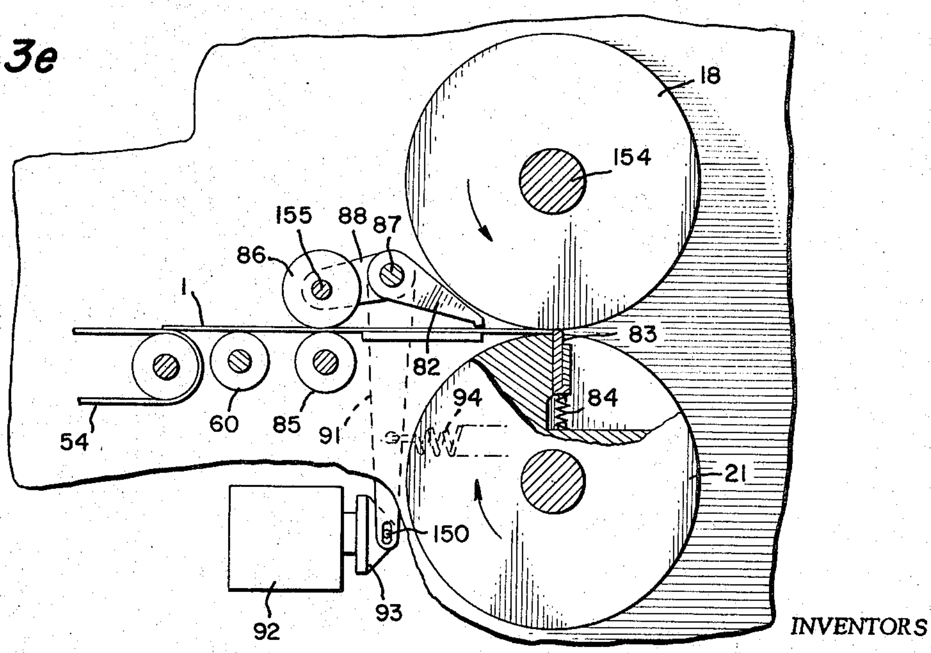
Figures 3F, 4:
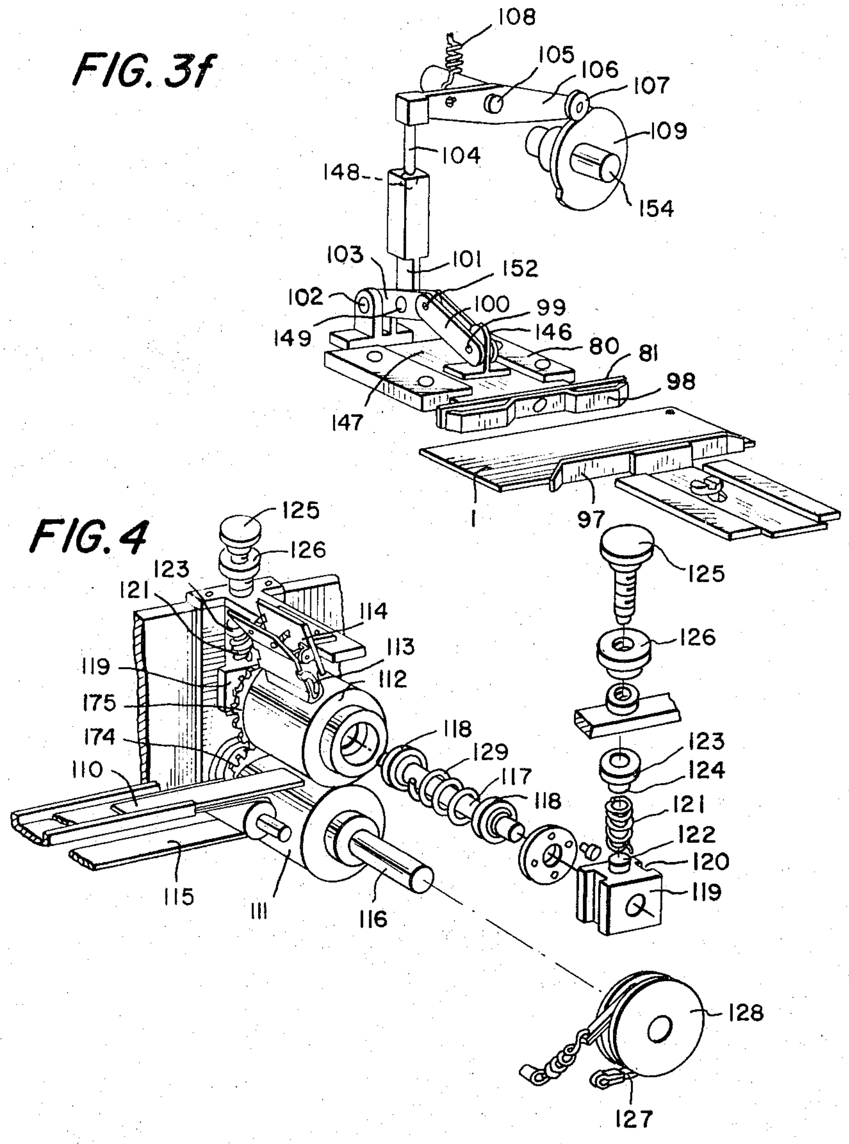
Figure 5A:
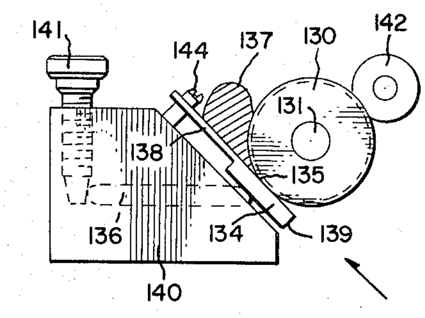
Figure 5B:
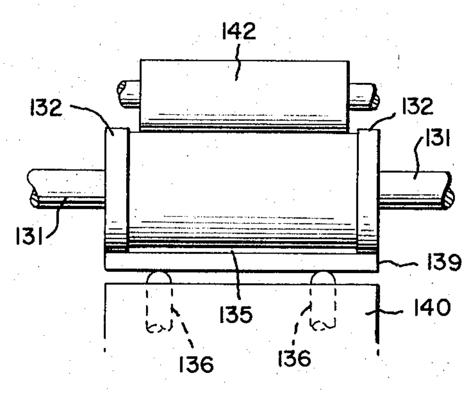
Figure 5C:
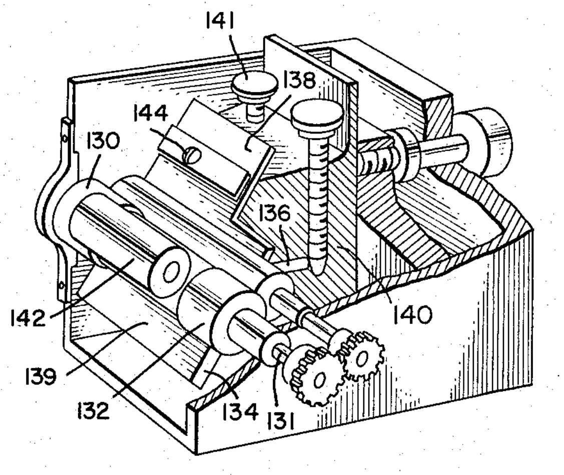
Figure 6A:
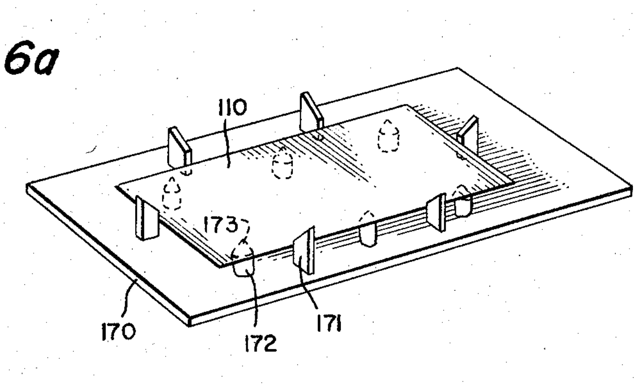
Figure 6B:
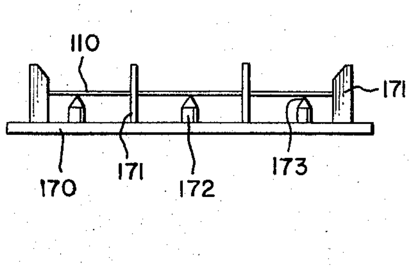
Figure 7:
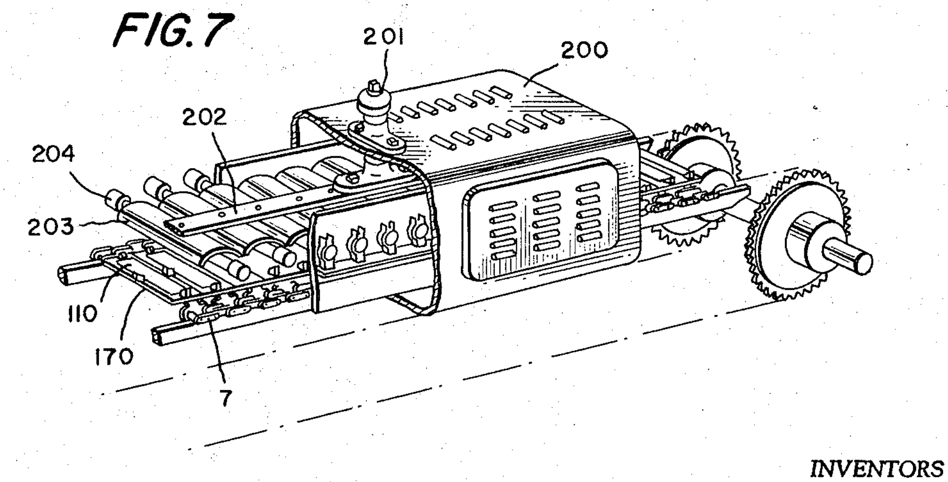
Figure 8A:
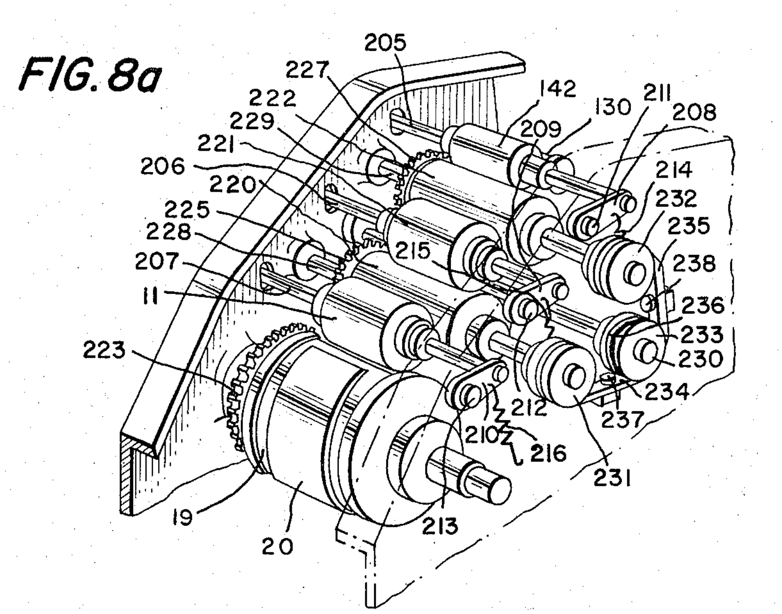
Figure 9:
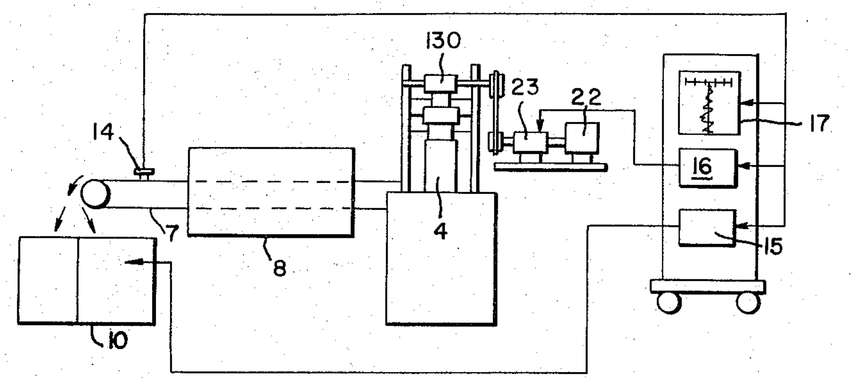
Figure 8B:
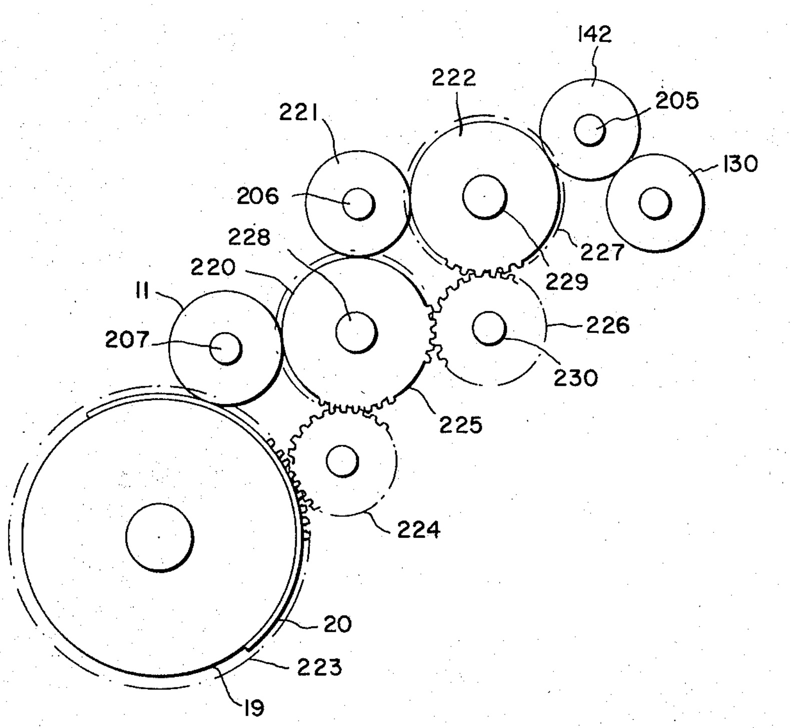
Figure 10:
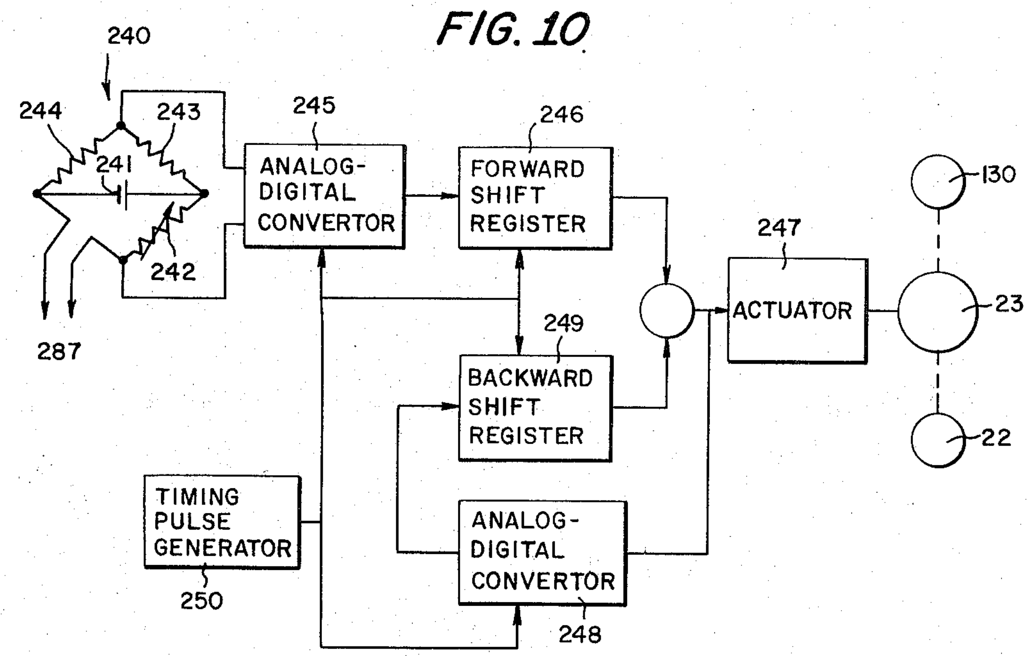
Figure 11:
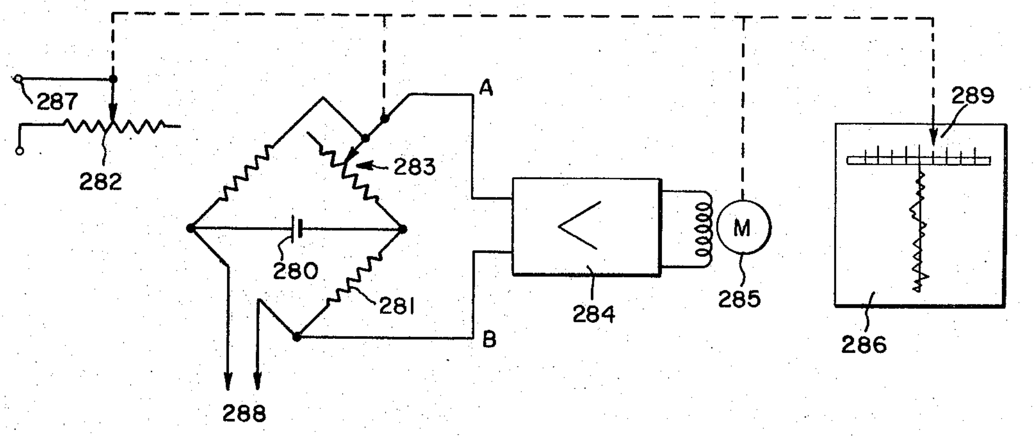
Figure 12A:
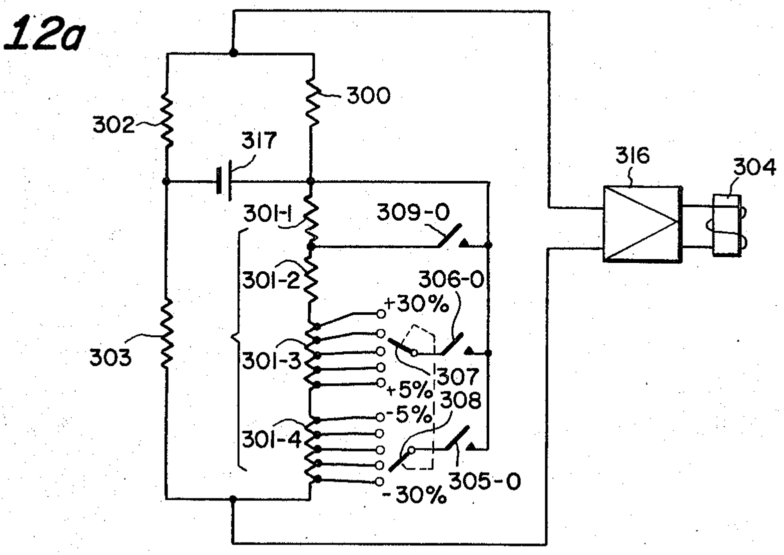
Figure 12B:
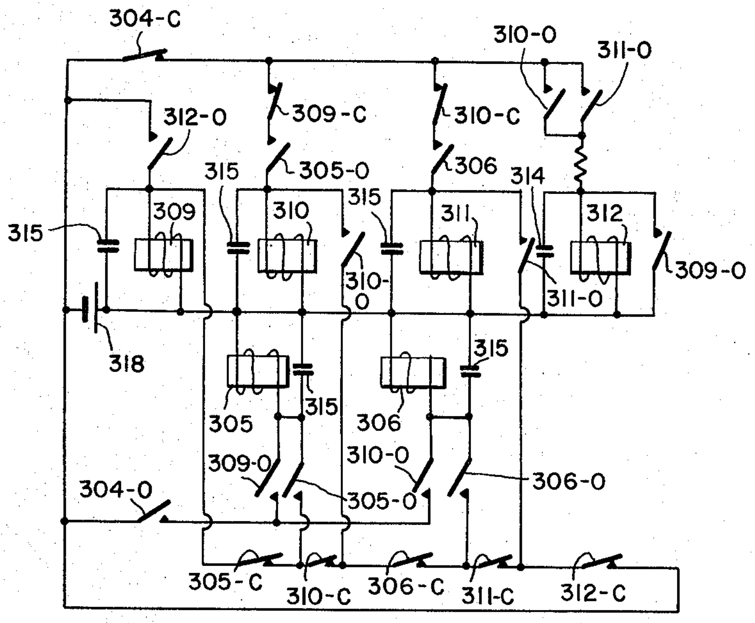

FIG. 3*a* is a plan view of a thickness inspection device, feeding roller system, and location control device for substrate sheet;

FIG. 3*b* is a side view of the device of FIG. 3*a*;

FIG. 3*c* is a diagrammatic view of a thickness inspection device showing its operation when two sheets or more enter between two rollers;

FIG. 3*d* is a side view of a printing location control device in the condition in which it holds substrate sheets prior to printing for controlling the dimensional stability with respect to a direction parallel to the advancing direction of substrate;

FIG. 3*e* is a side view of a printing location control device for controlling the position in the direction parallel to the advancing direction and which starts to print sheets following the positioning action of the device shown in FIG. 3*d*;

FIG. 3*f* is a perspective view of a printing location control device for controlling the dimensional stability with respect to a direction transverse to the substrate advancing direction;

FIG. 4 is a perspective view of a surface treating device forming part of the printing system in accordance with the present invention;

FIG. 5*a* is a schematic side view of an ink supply device forming part of the printing system in accordance with the present invention;

FIG. 5*b* is a front view of the ink supply device taken in the direction of the arrow in FIG. 5*a*;

FIG. 5*c* is a perspective view of the ink supply device forming part of the printing system in accordance with the present invention;

FIG. 6*a* is a perspective view of a pallet which supports printed resistors on projections for heating in a tunnel furnace;

FIG. 6*b* is a side elevation view of the pallet shown in FIG. 6*a*;

FIG. 7 is a perspective view of a tunnel furnace provided with infrared lamps and forming part of the printing system in accordance with the present invention;

FIG. 8*a* is a perspective view of an ink homogenizing device forming part of the printing system in accordance with the present invention;

FIG. 8*b* is a diagrammatic side view of FIG. 8*a*;

FIG. 9 is a circuit diagram illustrating the electrical connections between the resistance inspection device, automatic resistance recorder, automatic resistance control device and automatic sorting device forming parts of the printing system in accordance with the present invention;

FIG. 10 is a circuit diagram of the automatic resistance controller of FIG. 9;

FIG. 11 is a circuit diagram of the automatic resistance recording device of FIG. 9;

FIG. 12a is a circuit diagram of the automatic resistance sorting device of FIG. 9; and FIG. 12b is a circuit diagram of the relays of the resistance sorting device.

It has been discovered that a rotary offset press can be adapted according to the present invention to facilitate manufacturing of flat type film resistors to close tolerances of their electric resistance and other electrical properties such as humidity, temperature, and load life stability and a high dimensional stability.

An ink adapted to be used in the rotary offset press system of the present invention can be made from any kind of ink composition which will produce film resistors when printed on the substrate and subsequently heated to fix the resistance element. Operable inks are, for example, a carbon composition ink comprising carbon powder, graphite powder and/or metal powder as the resistance material and an organic binder such as a phenolic resin and an epoxy resin in an appropriate solvent such as benzyl-alcohol, tetraline and triethyleneglycol; a vitreous enamel resistor ink comprising a resistance material such as silver powder and palladium powder, and glass frit powder and an organic binder in a solvent; and an organo-metallic compound ink comprising an organic binder and an organo-metallic compound such as nickel formate and nickel oxalate which are converted into nickel film after they have been heated at a suitable temperture.

The preferred ink is a carbon composition ink comprising finely divided carbon powder, graphite powder and/or silver powder and an organic binder such as a phenolic resin in a solvent such as benzyl-alcohol.

Substrates adapted for printing by the present rotary offset press system can be of any kind of material which is an electrical insulator and is able to be fabricated into sheets having a flat and smooth surface. Any shape and thickness of said sheet can be used. For example, operable substrates are glass sheets, resin laminate sheets, ceramic sheets and asbestos sheets. The preferred substrate sheets are phenolic resin laminate sheets having a thickness of 0.2 to 3 mm.

Figures 1, 2:
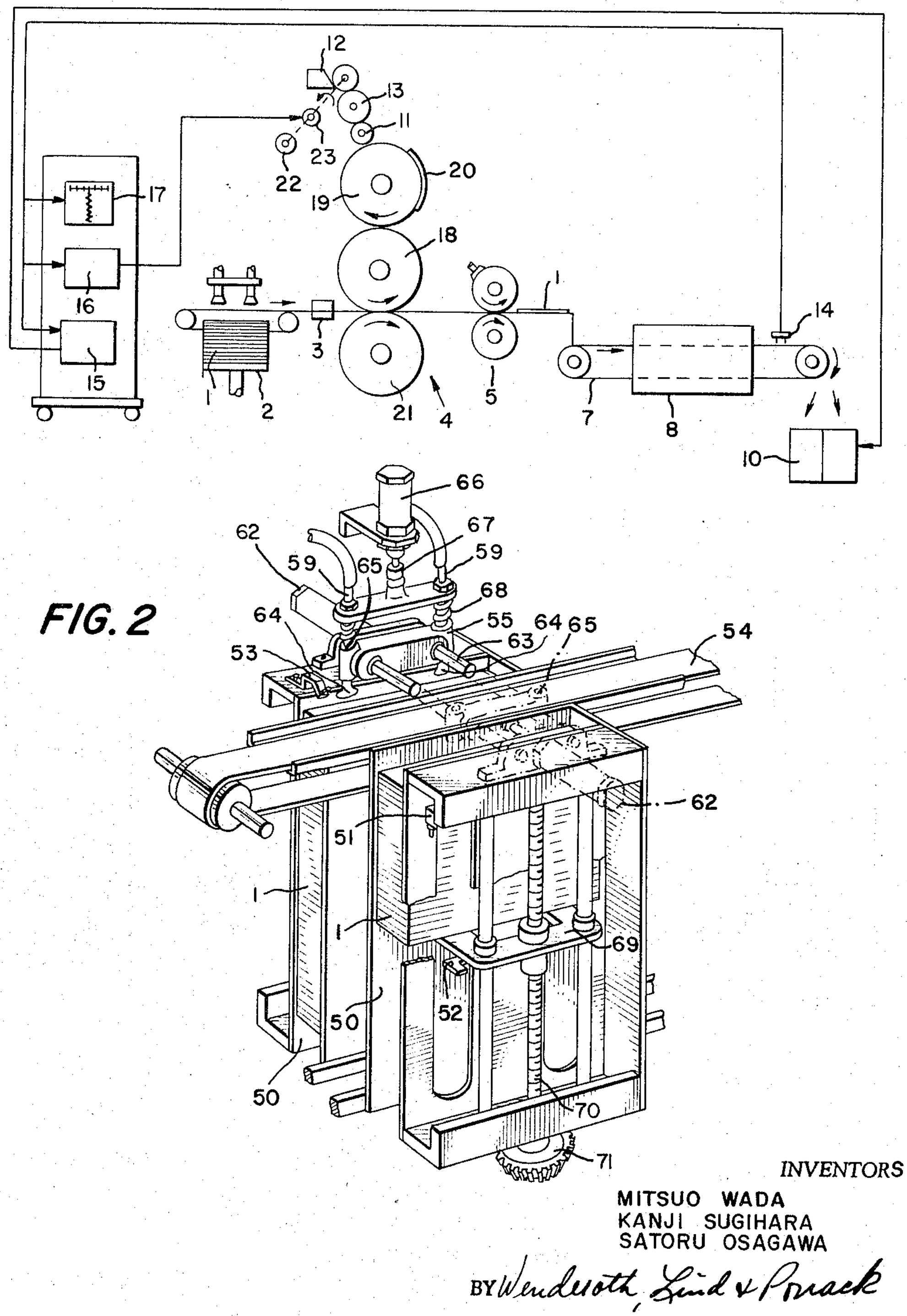
FIG. 1 is a schematic diagram of a printing system in accordance with the present invention including a rotary offset press.
FIG. 2 is a perspective view, partially cut away, of a substrate supplying device forming a part of the printing system in accordance with the present invention; device, feeding roller system, and location control device for substrate sheet.

Referring to FIG. 1, the printing system according to this invention comprises a rotary offset press 4 having an impression roller 21, a blanket roller 18, a printing roller 19 and an ink roller 11. Said blanket roller 18 has attached thereto a blanket sheet which can be replaced. The printing roller 19 has a printing pattern 20 on the surface thereof having a predetermined shape, which pattern is inked by said ink roller 11. The ink is transferred from said printing pattern 20 to said blanket roller 18 and substrate sheets of a given size and shape have the ink printed thereon so as to produce flat type film resistors thereon as the substrate sheets pass between said blanket roller 18 and said impression roller 21.

It is important in the printing system for the flat type film resistors that the films produced have a uniform thickness so that they will have uniform resistance and a high dimensional stability. For achieving these requirements, the rotary offset press 4 has combined therewith an ink supply device 12 operated by motor 22 which makes it possible to print films of a uniform thickness and uniform composition, a substrate supply device 2 which feeds substrate sheets 1 to said rotary offset press one sheet at a time and at exact time intervals, and a printing location control device 3 which makes it possible to place said sheets at an exact position between said blanket roller 18 and said impression roller 21. Details of the construction of these devices will be set forth hereinafter. Said rotary offset press combined with these devices into the system according to the present invention can print flat type film resistors meeting the above requirements.

Still referring to FIG. 1, reference character 5 designates a surface treating device which comprises at least one pair of rollers for pressing the surfaces of the printed resistors while they are in a wet state to make the surfaces of the film resistors smooth after they are heated in order to fix the binder of the ink composition. The film resistors having the pressed surfaces are subsequently transported to a tunnel furnace 8 by means of pallets mounted on a chain conveyor 7 in order to fix the binder in the ink compositions. The electrical resistance of the resultant film resistors is inspected by a resistance inspection device 14 which is electrically connected to an automatic resistance controller 16, which in turn is connected to a reduction gear 23 for the controlling ink supply device 12. When there is a deviation in the resistance from the predetermined value, an electrical signal is transmitted from said resistance controller 16 to said reduction gear 23 for ink supply device 12 in order to control the amount of ink which is supplied. The details of the construction of these devices will be set forth hereinafter.

Flat type film resistors satisfying the various requirements set forth above can be manufactured in an automatic operation by employing said rotary offset press 4 combined with said ink supply device 12, said substrate supply device 2, said printing location control device 3, said surface treating device 5, said furnace 8, said conveyor 7 having pallets and said automatic resistance controller 16. This combination makes possible a high production rate for flat type film resistors.

In order to attain full automatic operation, the combination should have included therein an automatic resistance recorder 17 and an automatic sorting device 15 with a resistor sorting box 10. The automatic sorting device 15 and sorting box 10 can divide the resistors which are produced into two groups, one having a resistance value which varies from a predetermined value by no more than given tolerance, and another having a resistance which deviates from the predetermined resistance by an amount greater than said tolerance. Said automatic resistance recorder 17 makes it possible to inspect the operation of all of the printing system and to control the operation. Further, it is preferred that said printing system has included therein an ink homogenizing device 13 for achieving a high uniformity of thickness of the printed resistance film. The details of the construction of said automatic recorder 17 and said automatic sorting device 15 will be set forth hereinafter.

*Substrate supplying device*

As shown in FIG. 2, the substrate supply device comprises two storage boxes 50, one positioned on each side of a belt conveyor 54. A substrate carrier 55 is positioned above each storage box 50. When one of said substrate carriers 55 is actuated, the other one remains at rest. The substrate carriers 55 are moved by an air motor 62 to transport the substrate sheets from said storage boxes 50 onto said belt conveyor 54. Said substrate carriers 55 move on guide rods 63 which are fixed to the frame and are positioned above both said storage boxes 50 and said belt conveyor 54.

Each of the substrate carrier 55 has two vacuum pipes 59 which are movable through the guide holes 65 in said substrate carrier 55. Said vacuum pipes 59 are pushed down by a piston 67 of an air motor 66, and are lifted by springs 68 when air pressure on said piston 67 is removed. Said vacuum pipes 59 are connected to a solenoid valve (not shown) which is alternately opened and closed to connect pipes 59 to a source of vacuum. Said vacuum pipes 59 have suction members 64 at the bottom ends thereof. Electrical signals are supplied to the solenoid valves of air motors 62 and 66 and the vacuum pipes 59, from a signal generator (not shown), which are synchronized with the rotation of the printing rollers. When substrate carrier 55 is positioned above one of the storage boxes 50 by the air motor 62, the vacuum pipes 59 are pushed down by the air motor 66 and then the solenoid valve connected to the vacuum pipes 59 is actuated to open them to the source of vacuum in such a way that the substrate sheet 1 on the top of said storage box is picked up by the suction members 64.

The vacuum pipes 59 holding a sheet are lifted by the springs and the substrate carrier moves laterally to a position above the conveyor belts 54. When the vacuum pipes 59 are cut off from the source of vacuum by the operation of the vacuum valve controlled by an appropriate electrical signal, the substrate sheet 1 is placed on the belt conveyor 54 and is carried forward in order to have resistors printed thereon.

The substrate carrier 55 is returned to its initial position above the storage box 50 and repeats this cycle. After several substrates on the top of the one storage box 50 are removed by said suction members 64, an optical level inspector 53 electrically connected to a motor (not shown), which drives a screw 70 supplies an electrical signal which controls the action of said motor so as to rotate said screw 70 and raise the level of the substrate to a predetermined position. Said screw 70 is connected to the motor through a reduction gear 71 and a magnetic clutch (not shown), and lifts the substrate holder 69 upwardly. The level inspector 53 controls the operation of the magnetic clutch. When the substrate sheets in one storage box 50 are almost exhausted, the other substrate carrier 55 is actuated to supply the substrate sheets in the other box automatically. The other substrate carrier is actuated by a signal from an inspection switch 51 which is pushed by an arm 52 fixed to said substrate holder 69. When the storage box is empty, a new supply of substrate sheets is supplied to the substrate holder 69 which is forced to the lowermost position by hand.

Referring to FIG. 3*a* and 3*b*, substrates placed on the belt conveyor 54 are transported between an inspection roller 56 and an idler roller 60 which inspect the thickness of the substrate. The shaft 153, on which inspection roller 56 is mounted, is attached to an arm 72 which is fixed on a fulcrum shaft 61. A cam follower 75 is mounted on one end of a lever 74 which is pivotally mounted on the fulcrum pin 73.

A spring 76 biases the lever 74 to hold the cam follower 75 in contact with a cam 77 which is fixed on a shaft 154 of the blanket roller 18.

The other end of the lever 74 is connected to the one end of a link 78 by a pin 41 and the other end of the link is connected to a lever 79 by a pin 42. Lever 79 is fixed to the fulcrum shaft 61.

During the rotation of the blanket roller 18, the inspection roller 56 is pivoted around fulcrum shaft 61 by lever 74, link 78 and lever 79, and simultaneously therewith a lever 58, mounted on the fulcrum shaft 61, pivots therearound so as to operate a switch 57. Inspection roller 56 is spaced from roller 60 a distance equal to the thickness of two or more substrate sheets, preferably the thickness of several substrate sheets during the time said cam follower 75 contacts the circumference of large diameter part of said cam 77. When a substrate sheet moves between said roller 56 and idle roller 60 and said cam follower 75 moves along the small diameter part of said cam 77, said spring 76 actuates said inspection roller 56 to inspect the thickness of substrate, and at the same time a lever 58 moves around a fulcrum shaft 61 in a direction toward switch 57 which is electrically connected to the rotary offset press 4 and to the substrate conveyor 54 and carrier 55. The thickness inspection is performed very precisely by magnifying the thickness of a substrate sheet by the lever 58. When only one sheet is transported by said conveyor 54, the cam follower rides on the small diameter part of cam 77 and lever 58 pushes said switch 57, as shown in FIG. 3*d*. When two or more sheets enter between said inspection roller 56 and idle roller 60 at the same time, the cam follower is spaced from cam 77 and lever 58 does not push said switch 57, as shown in FIG. 3*c*. Said switch 57 shuts off the electric circuits of the rotary offset press 4 and the substrate conveyor 54 and carrier 55 when it is not pushed. Such a substrate supplying device can safely feed substrate sheets one at a time to a rotary offset press at a precise time interval.

*Printing location control device*

When a number of film resistors in a single pattern are printed on one sheet all at the same time, the location of the film resistors is important for subsequent printing of terminal electrodes superposed on the resistors. A printing location control device according to the present invention achieves a high dimensional stability and accordingly facilitates an exact inspection of the resistance by the resistance inspection device 14. Said printing location control device can control dimensional stability with respect to the advancing direction of the sheets and the transverse direction thereof as shown in FIG. 3*a*, *b*, *d*, *e*, and *f*.

Referring to FIGS. 3*a*–3*f*, a feed roller system positioned in advance of the rotary offset press is coupled to a projection 83 mounted in recess 90 of the impression roller 21 of the rotary offset press. Said feed roller system comprises an idle roller 85 and a feed roller 86 on an arm 88 fixed on a fulcrum shaft 87 and a stop 82 fixed on the middle part of the fulcrum shaft 87 pivotable around the fulcrum shaft 87. Said stop 82 will be in a down position to block a sheet from advancing when said feed roller rises, and said stop does not touch the surface of sheet. The one end of a lever 91 is fixed to said fulcrum shaft 87 and the other end is connected to a plunger 93 of a solenoid 92 by means of a connection pin 150. Said solenoid 92 is operated by an electrical signal which is supplied from aforesaid signal generator. When electrical current is transmitted to the solenoid 92, the stop 82 is moved to the down position. When the current is not supplied the stop 82 is raised and the feed roller 86 is pushed down by the force of a spring 94 attached to said lever 91. The projection 83 is biased outwardly of and is movable in the radial direction of said impression roller 21 by a spring 84 in the recess. Said spring 84 is secured at one end to the bottom of recess 90 in said impression roller. The other end of said spring 84 is secured to said projection 83 which slides in the recess 90.

A substrate sheet 1 transported by the conveyor 54 from said substrate supply device passes between said feed roller 86 and said idle roller 85 and is blocked by said stop 82. When the projection 83 moves to the predetermined position where it passes by the front end of stop 82, as seen in FIG. 3*d*, the electric current of solenoid 92 is cut off by aforesaid signal generator and said stop 82 is lifted by the spring 94 and at the same time said feed roller 86 presses the sheet down in order to feed the sheet between said impression roller 21 and the blanket roller 18. The feed roller 86 is driven by drive gears 89, 95 and 96. The gear 95 is fixed to the shaft 154 of blanket roller 18, and the gear 89 is fixed on the shaft 155 of the feed roller 86. The gear 96 is mounted on the fulcrum shaft 87 and is able to rotate freely relative to the fulcrum shaft. Because the peripheral velocity of said roller 86 is higher than that of said impression roller 21 and said blanket roller 18, the substrate is pushed against the projection 83 in order to locate the sheet precisely at the predetermined printing position as shown in FIG. 3*e*. Once the sheet is grasped between the impression roller 21 and the blanket roller 18, the speed of the sheet is determined by said impression roller 21, which has a lower peripheral velocity than that of said feed roller 86, because said impression roller 21 presses on the sheet more strongly than does said feed roller 86. After the entire substrate moves between the impression and blanket rollers, said solenoid 92 moves the stop 82 downwardly and feed roller 86 upwardly in order to regulate the position of the following substrate.

Referring to FIG. 3*f*, a pushing plate 81 is attached to a pushing plate holder 147, which in turn moves within a guide 80 transverse to the sheet advancing direction. A spring plate 98 is attached to the front of said pushing plate 81. The substrate sheet held by the aforesaid stop 82 is pressed lightly against a location control plate 97 opposite said pushing plate 81 by said spring plate 98. Said pushing plate holder 147 has a pin supporter 146 thereon which has one end of a link 100 pivoted thereto by a joint pin 99. The other end of the link 100 is pivoted to one end of a lever 103 by a joint pin 152, and lever 103 moves around a fulcrum pin 102 fixed to the frame of the apparatus. The one end of a link 101 is pivoted to the lever 103 by a joint pin 149. The other end of said link 101 is joined to one end of a link 104 by a ball joint 148. The other end of the link 104 is connected to one end of the lever 106 by a ball joint 151 which moves around the fulcrum pin 105 so as to displace the link 104. A movable cam follower 107 is connected to the other end of said lever 106 and is always pressed against a cam 109 by a spring 108. Cam 109 is fixed to the shaft of said blanket roller 18. When said cam follower 107 contacts cam 109 at the large diameter part of the circumference thereof, the links 101 and 104 are pushed down in such that way that said substrate sheet is pressed against said location control plate 97 until it lies entirely between said impression roller 21 and the blanket roller 18. When said cam follower 107 comes to the small diameter part of the circumference of said cam 109, said pushing plate 81 is pulled backwards by the action of said spring 108 so as to act on the next substrate.

Such a printing location control device achieves a dimensional stability of ±0.1 mm. with respect to a direction parallel to the direction of advance of the sheet and a direction transverse to the direction of advance of the sheet.

*Surface treating device*

The surface treating device 5 is shown in FIG. 4. The substrate sheets 110 having the resistance film printed thereon by the rotary offset press 4 are transported, by a conveyor 115, to the surface treating device comprising a feeding roller 111 and a surface treating roller 112. Said feeding roller 111 and said surface treating roller 112 are driven by gears 174 and 175. Said gear 174 is fixed on a shaft 116 of the feeding roller 111 and is in mesh with said gear 175 which is fixed on the boss of the surface treating roller 112. The gear 174 is driven by a gear (not shown) which transmits rotational movement from a motor (not shown). The surface treating roller 112 is mounted on two radial ball bearings 118 fixed on a shaft 117 which is supported by the shaft holder 119 at both ends thereof. Said roller 112 is positioned so that there is a smaller gap between it and said roller 111 than the thickness of the substrate sheets by said shaft holder 119 in order to facilitate the entry of the substrate sheet between the two rollers 111 and 112. The shaft holder 119 is able to move vertically in a guide groove 120. The substrate sheet passes between two rollers 111 and 112 while being pressed by the surface treating roller 112 which is pressed down by the springs 121. Said spring 121 is held by the projection 122 on the shaft holder 119 and the projection 124 on the washer 123 which is in contact with the lower end of an adjustable screw 125. The force of the spring 121 can be changed by said adjustable screw 125 which is fixed by a lock nut 126. The rollers 111, 112 are braked in order to rotate smoothly and prevent gear marks on the surface of the printed resistance film. The feeding roller 111 is braked by a brake band 127 which is wound around the circumference of a brake drum 128 fixed on the shaft 116 of the feeding roller. The surface treating roller 112 is braked by a spring brake 129 which is fixed to the shaft 117 at one end and freely contacts the inside surface of the surface treating roller 112 so as to brake said roller 112 when it rotates in the reverse direction. The printed resistance film is wet and has a rather rough surface which is not suitable if the resistors are used as variable resistors because of their short life due to abrasion, and is not suitable for giving a good voltage coefficient to fixed resistors. The said rough surface is smoothed when the sheet passes between the two rollers 111 and 112. Since the printed ink is still wet during this step, the wet ink is apt to adhere to the surface of said roller 112 and if this occurs, the thickness of film will be changed.

To avoid this adhesion, the surface of said roller 112 is highly polished and coated with a liquid which does not adhere to said wet ink and does not dissolve the binder constituent of the ink composition. A suitable liquid is, for example, terebinth oil methylcyclohexane and dodecan, where the binder composition of the ink is a phenol resin. It is preferable to use a liquid having a high vapor pressure which evaporates easily during a subsequent heat treatment in the tunnel furnace 8 even when such a lubricant liquid is present on said printed resistors.

Said liquid can be applied to the surface of said roller 112 by using a brush 113 grasped by a brush holder 114.

Such a surface treating device can smooth the surface of the printed film and produce a variable resistor having a long life under abrasive conditions and low rotational noise because it has a smooth surface. In addition, the voltage coefficient of fixed resistors can be improved by employing such a surface treating device.

The beneficial effect of said surface treating device can be seen from the following specific example.

Variable resistors having a horseshoe shape are prepared by employing a rotary offset press system having a surface treating device according to the present invention and are compared with resistors prepared by a conventional dipping method or a rotary offset press printing system which has no surface treating means.

In each case, the flat type film resistors are prepared by applying to laminated phenol resin sheets a carbon composition ink consisting of 20% by weight carbon powder, 5% by weight graphite powder, 40% by weight phenol resin, and the remainder benzylalcohol as a solvent. The printed resistors are heated at 200° C. for one minute in a tunnel furnace, and subsequently heated at 160° C. for 4 hours.

The rotational noise level is found to be as set forth in Table 1.

TABLE 1

| | Rotational noise (mv.) |
|---|---|
| Printing without surface treat | 24 |
| Printing with surface treat | 9 |
| Dipping without surface treat | 19 |

*Ink supply device*

The ink supply device according to the present invention facilitates printing a resistance film having a uniform thickness and automatically controlling the amount of ink supplied.

The ink supply device 12 is shown in FIGS. *5a*, *5b* and *5c*. A fountain roller 130 is mounted on a shaft 131 and has a doctor blade 139 positioned adjacent thereto. The doctor blade has a flexible thin blade portion 138 and a rigid thick blade portion 134 and is made of steel. The thin blade portion 138 is secured by a rivet 144 to a mounting frame 140, and said thick blade portion 134 is urged toward the fountain roller 130 by push rods 136 slidable in frame 140 and abutted at the other ends thereof by the conically tapered end of an adjustable knob 141 which is mounted in said frame 140. The fountain roller 130 has a larger diameter portion 132 at the both ends which act as bearer rings. The gap 135 is made by urging the thick blade portion 134 against the larger diameter portion 132 of the fountain roller 130 with the adjustable knob 141. The thick blade portion 134 is necessary to prevent this portion, which governs the thickness of the film of ink, from bending due to excessive pressure from the rods 136. The ink 137 is fed through said gap 135, adheres to the surface of said fountain roller 130 and is transferred to a ductor roller 142 which in turn feeds the ink to subsequent kneading rollers.

The amount of ink which is supplied can be controlled automatically by changing the speed of rotation of shaft 131 of said fountain roller 130, which is driven by aforesaid motor 22 and reduction gear 23 which is connected electrically to resistance controller 16 in accordance with the invention.

*Pallets for conveyor in the tunnel furnace*

It is necessary that the printed resistors be heated uniformly over the entire sheet. It has been discovered that the pallet on which the resistors are carried has a great effect on the distribution of the temperature over the sheet when the sheet is transported by a conveyor into a tunnel furnace for heating.

FIGS. 6*a* and 6*b* show a pallet according to the present invention. The pallet comprises a metal plate 170 which has supporting projections 172 projecting upwardly therefrom and having pointed upper ends 173, and guides 171 around the edges thereof for use in positioning a substrate sheet precisely. A substrate 110 with a resistance film printed thereon is supported on said supporting projections 172. The pointed ends 173 keep the contact area between the projections 172 and said substrate 110 to a minimum. The preferred height of the projections is 3 to 30 mm. The supporting projections are preferably made of a material having a low thermal conductivity, for example, a synthetic resin such as phenol resin. The substrate can be heated uniformly in a tunnel furnace by employing such carrying pallets during the transportation by a conveyor.

*Heating furnace*

It is important for obtaining a uniform resistance film that the printed resistor be heated uniformly over the entire substrate in order to set the binder composition in the ink. It is necessary for a continuous operation and uniform heating that the heating furnace be a tunnel-type furnace which can maintain a uniform temperature in a direction transverse to the direction in which the sheets advance. It is convenient to employ a tunnel furnace having infrared lamps as heating elements for setting the binder.

The tunnel furnace 8 is shown in FIG. 7. The printed substrates 110 are placed on pallets 170 and are led through the furnace 200 housing having infrared lamps 204 mounted therein. Reflectors 203 having a parabolic cross-sectional shape are positioned above lamps 204. The reflectors 203 are mounted on a holding plate 202 which is movable up and down by two adjusting screws 201 mounted in the furnace housing 200. Said parabolic reflectors 203 reflect energy from said lamps in parallel rays. The infrared lamps 204 are positioned at right angles to the direction of movement of said chain conveyor 7 and each have a heating element therein which is arranged in such a way that the electric wattages at the terminal parts of the lamp ends are higher than that at the middle part thereof, so that a uniform temperature distribution can be achieved in a direction transverse to the direction of movement of said conveyor 7.

*Ink homogenizing device*

A further improvement in the uniformity of the thickness of the printed resistors can be achieved by an ink homogenizing device according to this invention.

The ink homogenizing device 13 is shown in FIGS. 8*a* and 8*b*. A ductor roller 142 receives ink from fountain roller 130. There are also provided a first kneading roller 222, a second kneading roller 221 and a third kneading roller 220. The third kneading roller 220 contacts the ink roller 11 which contacts the printing pattern 20 on printing roller 19 of the rotary offset press 4 and is fixed on the shaft 228. Said first kneading roller 222 and said third kneading roller 220 are rotated by gear train 223, 224, 225, 226 and 227. Said gears 225 and 227 are fixed on the shafts 228 and 229 of said kneading rollers, respectively. Said shafts 228 and 229 are able to move simultaneously in the axial direction thereof, moving alternately to one side and then the other side during a given time interval by shift rollers 231 and 232, cam 233, and levers 234 and 235.

Said cam 233 and gear 226 are fixed on the shaft 230, and are rotated by said gear train. The cam 233 has a groove 236 on its cylindrical surface. It should be noted that said groove 236 is curved to give an axial movement to the kneading roller 220 and 222.

Cam followers fixed on one end of levers 234 and 235 are inserted in said groove 236. Other cam followers (not shown) fixed on the another end of levers 234 and 235 are respectively inserted in the grooves of said shift rollers 231 and 232. Said levers 234 and 235 are pivotally mounted on the fulcrum pins 237 and 238 fixed on the frame. In such a way the axial movement of the kneading rollers 220 and 222 can be achieved by the curved groove 236 in association with the levers 234 and 235, shift rollers 231 and 232, and cam 233. The ductor roller 142, the second kneading roller 221 and the ink roller 11 are rotated around their own shaft 205, 206 and 207 supported by arms 208, 209 and 210, said arms being pivotally mounted on the fulcrum pins 211, 212 and 213. These rollers are rotated by the friction force which is caused by springs 214, 215 and 216 pushing these rollers toward the fountain roller 130, the first kneading roller 222, the third kneading roller 220 and printing roller 19 respectively.

The axial length of each of the rollers 142, 221 and 11 has a great effect on the uniformity of the thickness of the printed resistance films. It is necessary for the axial length of ink roller 11 to be 1% to 10% larger than the width of the printing pattern 20 on printing roller 19. The axial length of ductor roller 142 is required to be the same as the width of the printing pattern 20. It is necessary that the axial length of the first kneading roller 222 and the third kneading roller 220 be longer than that of said second kneading roller 221. According to the invention it is necessary in order to obtain an entirely uniform thickness with respect to an axial direction of rollers that the length of said second kneading roller 221 be the same as the sum of the dimension in the printing pattern 20 in the axial direction of roller 19 and the distance said first or third kneading rollers moves. When the length of said second kneading roller 221 is greater than said sum, the thickness varies in the axial direction of rollers, the surface curving concavely downwardly at the middle of printed ink. The opposite condition occurs when the length of said second kneading roller 221 is less than said sum.

When the distance the first or third kneading roller moves is 5 mm., the length of the printed ink is 34 mm. and the length of said second kneading roller is 39 mm., the variation in thickness in the axial direction of the rollers is ±5% of the present thickness as calculated from the resistance of the finished resistors.

*Automatic resistance control device*

The automatic resistance control means is shown in FIG. 9, which shows the relationship between automatic resistance control device 16, the automatic resistance recorder 17, the automatic resistance sorting device 15. The resistance inspection device 14 is positioned above the end of conveyor 7 to measure the resistance of resistors which have been heated in furnace 8. The automatic resistance recorder 17, the automatic resistance controller 16, and the automatic resistance sorting device 15 are each connected to the resistance inspection device 14. The rotary offset press is shown at 4 and the resistor sorting box 10 is also connected to said automatic sorting device 15.

The fountain roller 130 is rotated by the driving motor 22 which has a constant speed of rotation, and the rotational velocity of said fountain roller is controlled by the reduction gear 23 which is connected to and controlled by said automatic resistance controller 16.

When a finished resistor has an electric resistance which deviates from a predetermined value, the resistance controller 16 generates an electric signal proportional to said deviation. The electric signal so produced changes the reduction ratio of said reduction gear 23 appropriately, and thus controls the rotational velocity of said fountain roller 130. For example, when the finished resistor has a resistance lower than the predetermined value, the electric signal generated increases said reduction ratio and consequently reduces the rotational velocity of said fountain roller 130 so as to reduce the amount of ink supplied.

FIG. 10 is a block diagram of the automatic resistance controller shown in FIG. 9.

Referring to FIG. 10, a bridge circuit 240 comprises an electric supply source 241 and, on an arm of the bridge, a reference resistor 242 having a predetermined resistance, and resistors 243 and 244 and an input 287 connected to a signal transmitter 282 (FIG. 11) which is coupled to a recording pen 289 of a recorder 286 in a manner described hereinafter. The output voltage of said bridge circuit 240 is converted into a digital signal in binary form by a conventional analog-digital convertor 245 and then is transferred to a conventional forward shift register 246. The output voltage of said forward shift register 246 is transformed into a controlling signal which enters a conventional actuator 247 which in turn is connected to reduction gear 23 and controls the reduction ratio thereof.

The electric resistance measured by said resistance inspection device is that of a resistor made by an amount of ink supplied at a time earlier than the time when the resistance is measured. It is necessary in order to determine the amount of ink to be supplied to take into account the amount of ink supplied at the time earlier than the time when the resistance is measured. These considerations require a second conventional analog digital convertor 248 and a conventional backward shift register 249. The control signal applied to said actuator 247 is converted into a digital signal by said analog-digital convertor 248 and is fed to said backward shift register 249 which memorizes this signal during the period from the time at which ink is supplied to the time at which resistance is measured. This period is the time lag of the control process. A combination of the two output voltages of said shift register 246 and 249 finally produces a controlling signal to control the rotational velocity of said fountain roller 130.

A timing pulse generator is shown at 250. A source of DC current (not shown) is connected to the system in a conventional manner.

Such a device can control the amount of ink supplied and thus the resistance of the finished resistors. For example, a large amount of ink forms a thick film which has a low electrical resistance. The rotational velocity of said fountain roller 130 is adjusted so as to produce a predetermined resistance. When the resistance of the finished resistors deviates from the predetermined value, said resistance controller immediately controls the speed of rotation of said fountain roller in a sense so as to correct the deviation.

*Automatic resistance recorder*

The circuit diagram of aforesaid automatic resistance recorder 17 is shown in FIG. 11. Terminals 288 in one leg of a bridge are connected to the resistance inspection device 14 shown in FIG. 1. A source of power 280 is provided in the bridge and a reference resistor 281 having a predetermined resistance forms another leg. The bridge is adjusted in such a way that no output voltage is generated across points A and B of this bridge when the resistance measured by the resistance inspection device is the same as said reference resistance 281. A deviation of the measured resistance from the reference resistance 281 generates an output voltage across said terminals A and B. This output voltage is amplified by a conventional amplifier 284 and drives a balancing motor 285 which is connected to a variable resistor 283 in said bridge.

The recording pen 289 forming part of said recorder 286 is coupled to said balancing motor 285 and records said deviation. It is possible to record the deviation for each resistor because recording paper is fed past said recording pen automatically. A signal transmitter 282 is connected to said balancing motor 285, and the actual resistance of said transmitter 282 is connected to the input 287 of bridge 240 shown in FIG. 10.

By employing such an automatic resistance recorder, one can easily inspect the operation of the whole printing system and determine whether it is operating property or not.

*Automatic sorting device*

The automatic sorting device 15 according to this invention is capable of providing five reference resistors respectively having a deviation of ±5, ±10, ±15, ±20 and ±30% from the determined value. For each reference resistor, said device can divide resistors being measured into three groups, that is, resistors higher than the upper limit of the reference resistor, resistors within the upper and lower limits of the reference resistor, and resistors lower than the lower limit of the reference resistors. The resistor sorting box 10 collects only the resistors within the upper and lower limits of the reference resistor.

The sorting device is shown in FIGS. 12*a* and 12*b* and comprises resistor 300 to be tested and a reference resistor 301 is connected in a bridge circuit in combination with resistors 302 and 303. Said reference resistor 301 comprises resistor 301–1, 301–2, 301–3 and 301–4. The resistance of said resistor 302, 303 and 301 varies with the resistance of the resistor 300 to be tested. The resistors 301–3 and 301–4 have five selecting terminals, which decide upper limits and lower limits of the reference resistance, that is, a deviation +5, +10, +15, +20 and +30% and a deviation, −5, −10, −15, −20 and −30% from the predetermined reference resistance, respectively. A given variation can be achieved by connecting a selecting arm 307 with one of said selecting terminals of resistor 301–3 with respect to the upper limit and simultaneously connecting a selecting arm 308 with one of said selecting terminals of resistor 301–4 with respect to the lower limit having the same deviation as that of the upper limit. A DC current is supplied by a battery 317. Relay contact 305–0, 306–0 and 309–0 are connected across portions of the reference resistor 301 to enable a selection of the lower and upper limits of predetermined deviation from the reference resistor and an open circuit equivalent to a resistance deviation higher than +400%, respectively. The output voltage of the bridge is amplified by an amplifier 316 and operates a relay 304 when the resistance value $R_x$ of the resistor 300 to be tested is lower than $R_s \cdot R_1/R_2$, where $R_s$, $R_1$ and $R_2$ are the resistance values of reference resistor 301, and resistors 302 and 303 respectively. Relays 305, 306, 309, 310, 311 and 312 have normally closed contacts designated by the corresponding number and a suffix C and normally open contacts designated by a suffix 0. They are connected in a network which chooses the parts of said reference resistance 301 sequentially by operating the contacts 305–0, 306–0 and 309–0 depending upon the resistance $R_x$. Said relays can be made to operate at precise values by capacitors 315. The relays are provided with DC voltage from a DC source 318.

When resistance $R_x$ is higher than +400% of the reference resistance, only said relay 309 operates through closed contacts 305–C, 310–C, 306–C, 311–C and 312–C. Since the resistance $R_x$ is higher than the reference resistance $R_s$, the sorting device of FIG. 12*a* with a closed contact 309–0 is equivalent to an open circuit. When the resistance $R_x$ is lower than the reference resistance, the output of the bridge circuit causes said relay 304 to operate and consequently said relay 305 is actuated through the now closed contacts 304–0 and 309–0 of FIG. 12b. Relay 305 is kept actuated by its own holding contact 305–0 in FIG. 12b and opens its contact 305–C so as to release said relay 309. A single portion of the reference resistance representing the lower limit of the resistance is thus placed in the bridge circuit of FIG. 12a by the thus closed contact 305–0.

If the resistance $R_x$ is less than the lower limit, contact 305–0 remains closed and there is no further output from the bridge circuit, which indicates that the sample resistance is below the lower limit of the reference resistance. If the resistance $R_x$ is greater than the lower limit, the output of the bridge circuit is such that said relay 304 is released again. Relay 310 has in the meantime been operated through the contacts 309–C and 305–0, and closes switch 310–0 in the circuit of relay 306. The contacts 305–0, 306–0 and 309–0 in FIG. 12a are then all opened and all portions of the reference resistance, i.e. a resistance higher than +400%, are thus placed in the bridge circuit, and thus the output from the bridge is such as to immediately actuate the relay 304 again. When the output from the bridge circuit actuates relay 304, switch 304–C opens and 304–0 closes. This energizes relay 306 which is held by switch 306–0, and de-energizes relay 310. Energizing of relay 306 closes switch 306–0 in FIG. 12a.

If resistance $R_x$ is lower than the resistance of the two parts of resistance 301, no signal will be generated in the bridge circuit. If resistance $R_x$ is above the resistance of the two parts of the resistance 301, relay 311 will operate in the same manner as relay 310.

If the resistance $R_x$ is less than the upper limit placed in the bridge circuit by the closed contact 306–0, the lack of an output will indicate an acceptance of the sample resistance.

Relay 312 operates slowly because it comprises a resistance 313 and a capacitance 314.

When said relays 310 and 311 are kept actuated and at the same time said reference resistance is higher than +400%, said slow operation makes it possible to prevent said relay 309 from operating prior to the operation of said relay 304 when the relay 310 or 311 is held and the contact 310–0 or 311–0 in the circuit of the relay 312 is closed. When resistance $R_x$ is removed the relay 304 is not actuated by the output from the bridge and then the relay 312 is actuated after its slow operating time and resets all relays.

Said relay contact 306–0 generates an acceptance signal which is coupled to the resistor sorting box and makes it possible to collect only acceptable resistors.

The following examples set forth specific embodiments of this invention and should not be construed as limitative.

*Example 1.—Manufacture of variable resistors*

Substrate sheets are made from phenol resin laminate sheets having dimensions of 150 x 37 mm. and a thickness of 0.5 mm. The printing ink comprises 10% by weight of carbon black powder, 5% by weight of natural graphite powder, 50% by weight of phenol resin as a binder, and 35% by weight of benzyl-alcohol as a solvent. A mixture of these ink ingredients is kneaded by a three-roller kneading means for producing a uniform composition. A printing speed of 1800 sheets per hour can be achieved by employing a rotary offset press printing system comprising the aforesaid rotary offset press, the ink supply device, the printing location control device, the surface treating device, the tunnel furnace, the conveyor pallets, the ink homogenizing device, the automatic resistance control device, the automatic resistance recorder, and the automatic sorting device in accordance with the present invention. Each sheet has 18 horseshoe-shaped resistors, 14 mm. in diameter, having a dimensional stability of ±0.1 mm. in every direction.

Such a dimensional stability can be achieved by employing a printing location control device in accordance with the present invention. The printed resistors are treated with the above-described surface treating device for smoothing their surfaces and are heated at 200° C. for 1 minute by transporting said resistors on pallets mounted in a conveyor into a tunnel furnace having infrared lamps.

The resistance of a conductor is proportional to the length and inversely proportional to the cross-sectional area of the conductor. For a given thickness, the resistance of a film then becomes proportional to the length and inversely proportional to the width of the film and, if the length also equals the width, the resistance remains constant regardless of the size of the film. The term "ohms per square" is therefore employed as the unit of resistance of the electrically conducting films described herein. When the automatic resistance control means is not used, the cured resistors have a surface resistivity of 7.4KΩ per square as compared to the predetermined value of 6.7KΩ per square. Use of the control means makes it possible to control the electric resistance of the resistors so that they have a surface resistivity of 6.7KΩ ±4% per square. The cured resistors subsequently have printed terminal electrodes thereon at a speed of 1800 sheets per hour and with a dimensional stability of ±0.1 mm., the terminal electrodes being superposed on the cured resistors, and the thus printed resistors are heated at 160° C. for 4 hours. The resultant resistors have a surface resistivity of 6KΩ per square and are punched into a horseshoe shaped-form having a total resistance of 50KΩ.

The resultant resistors have linearly variable resistors having a diameter of 14 mm. and 50 KΩ total resistance. Such resistors can be manufactured at a production yield of 98% and to a tolerance of ±10% by employing a rotary offset press printing system illustrated in the preceding description.

The resistors so produced have a high thermal stability. The resistance variation is −4.5% ±0.4% after a test at 70° C. for 250 hours.

The resistors are tested at 40° C. in 90% relative humidity at a rating power of 0.1 w. and 71 v. for 350 hours in such a way that the resistors are supplied with a DC current sufficient to produce the rating power for 1 hour and a half, and then the DC current is cut off for the following 30 minutes. The resistance variation after the test is +5.5% ±0.6%.

The resistance variation is +2.5% ±0.4% after a rotational test carried out by rotating the shaft of variable resistors 15,000 cycles at a rotating velocity of 600 cycles per hour.

The rotational noise is 10 to 15 mv. when the variable resistors have a DC voltage of 20 v. applied thereto when the variable resistor shafts rotate at a velocity of 30 cycles per minute.

*Example 2.—Manufacture of fixed resistors*

Substrate sheets are made from phenol resin laminate sheets having dimensions of 150 x 37 mm. and a thickness of 0.5 mm. The printing ink comprises 13% by weight of carbon black powder, 2% by weight of natural graphite powder, 50% by weight of phenol resin as a binder, and 35% by weight of benzylalcohol. These ink ingredients are well mixed by a three-step roller mixing device for producing a uniform composition.

A printing speed of 1800 sheets per hour can be achieved by employing a rotary offset press printing system comprising the above-described rotary offset press, the ink supply device, the substrate supply device, the printing location control device, the surface treating device, the tunnel furnace, the conveyor pallets, the ink homogenizing device, the automatic resistance control device, the automatic resistance recorder, and the automatic sorting device in accordance with the present invention. A dimensional stability of ±0.1 mm. can be achieved by employing the above described printing location control device in accordance with this invention.

The printed resistors are treated by the above described surface treating device for smoothing their surfaces and are heated at 200° C. for 1 minute by transporting said resistors on pallets mounted in the conveyor into the tunnel furnace having infrared lamps. When automatic control device is not used, the cured resistors have a surface resistivity of 13.5 KΩ per square, as compared to the predetermined value of 11.9 KΩ per square. With the control device operative, the apparatus can print the resistors having a surface resistivity of 11.9 KΩ ±4% per square.

The cured resistors subsequently have terminal electrodes printed thereon at a speed of 1800 sheets per hour with a dimensional stability of ±0.1 mm., the terminal electrodes being superposed thereon and are then heated at 160° C. for 4 hours. The resistance films have a surface resistivity of 10.7 KΩ per square at the end of this step and are then punched into a desired form. The punched resistors are provided with lead wires by a mechanical clamping operation and are coated with resin for protecting the films from humidity and mechanical damage. The resultant resistors have a total resistance of 8 KΩ.

One sheet can make 92 resistors which have a dimension of 4 x 7 mm. and total resistance of 8 KΩ. Such a resistor can be manufactured at a production yield of 95% and to a resistance tolerance of ±10%.

The fixed resistors so produced have a voltage coefficient of −0.008 to −0.01% per volt, defined as in the following equation:

$$\text{Voltage coefficient} = \frac{R_1 - R_2}{R_2} \times \frac{1}{E_1 - E_2} \times 100(\%)$$

where:

$E_1$=a rating voltage (28.3 v.) ($V$)
$E_2$=$\frac{1}{10}E_1$ ($V$)
$R_1$=a resistance at $E_1$ (Ω)
$R_2$=a resistance at $E_2$ (Ω)

The resistance variation is 4.3% ±0.5% after a humidity test carried out by drying the reference resistor at 50° C for 96 hours and cooling it at room temperature for 30 minutes and subsequently keeping it at a relative humidity of 95% at 40° C. for 240 hours.

The resistors are tested at 40° C. for 500 hours by repeating a cycle in which a DC current with a rating power of 0.1 w. is applied for 1 hours and a half and is shut off for the following 30 minutes. The resistance variation is −4.2% ±0.3% after the test.

What is claimed is:

1. A printing apparatus for manufacturing flat type film resistors to predetermined specifications, comprising a rotary offset press having an impression roller, a blanket roller rolling against said impression roller, a printing roller rolling against said blanket roller, and an ink roller rolling against said printing roller, means for supplying a predetermined pattern of ink to said ink roller for transfer to said printing roller and to said blanket roller, means for feeding substrate sheets of a given size between said blanket roller and said impression roller for printing said predetermined pattern of ink thereon to produce flat type film resistors, a printing location control device attached to said impression roller for positioning said substrate sheets between said blanket roller and said impression roller precisely with respect to the dimension in the direction of movement of the substrate sheet, whereby the printed resistors have a high dimensional stability in said direction, a printing location control device for positioning said substrate sheet precisely with respect to the dimension in the transverse direction of movement of the substrate sheet, whereby the printed resistors have a high dimensional stability in said direction, a heating furnace positioned adjacent the output side of said rotary offset press and having a conveyor with pallets thereon receiving printed substrates and conveying them through said furnace for setting the binder composition in said printed resistors, and an automatic resistance control device, a resistance inspection device adjacent the output side of said apparatus and electrically connected to said resistance control device and an ink supply control device coupled to said ink supply means and electrically connected to said resistance control device, whereby the electric resistance of printed resistors is automatically corrected by adjusting the amount of ink supplied by said ink supply means in response to a deviation of the resistors in electric resistance from a predetermined value.

2. A printing apparatus as claimed in claim 1 in which said means for supplying ink comprises an ink supply device in contact with said ink roller, and said means for feeding substrate sheets comprises a device for storing a plurality of substrate sheets and transporting said substrate sheets one at a time to said rotary offset press.

3. A printing apparatus as claimed in claim 2, wherein said ink supply device comprises a fountain roller and a doctor blade associated therewith, said doctor blade being a plate having a thick part adjacent to said fountain roller for preventing said doctor blade from bending under pressure exerted thereon, said fountain roller having bearer rings at the both ends thereof and having a little larger diameter than the middle part of said fountain roller, said bearer rings being urged against said thick part for keeping a constant gap between said doctor blade and said fountain roller.

4. A printing system as claimed in claim 2, wherein said substrate supplying device includes a safety controller connected to said rotary offset press to shut the electric supply circuit of said rotary offset press off automatically when said rotary offset press is fed a number of substrate sheets greater than one at the same time.

5. A printing apparatus as claimed in claim 1, wherein said printing location control device comprises a small projection, said impression roller having a recess therein in which said projection is movably positioned, said projection being spring loaded for easy movement in the radial direction of said impression roller, said projection holding a substrate sheet until said projection is pressed down by said blanket roller, a feeding roller which rotates at a circumferential velocity higher than that of said impression roller and bears on the substrate sheets at a pressure lower than that of said impression roller, a lever having said feeding roller mounted on the end thereof remote from said impression roller, a fulcrum shaft on which the other end of said lever is fixed, a stop fixed on the same fulcrum shaft, a solenoid positioned adjacent said lever and energized to hold said stop down to hold said substrate sheet, and a spring attached to said lever and pivoting said lever to move roller down at the moment when said projection passes the predetermined point, whereby a substrate sheet is fed between said impression roller and said blanket roller by said feeding roller.

6. A printing apparatus as claimed in claim 1, wherein said printing location control device comprises a pushing plate holder, a spring plate which is attached to the front of said pushing plate holder, a location control plate being positioned opposite said pushing plate holder, and driving mechanism coupled to said pushing plate holder and said spring plate lightly pushing the substrate sheet against said location control plate until it lies entirely between said impression roller and the blanket roller.

7. A printing apparatus as claimed in claim 1 and further comprising a surface treating device comprising at least one pair of rollers adjacent the output side of said rotary offset press and through which the printed substances are passed for smoothing the surface of said printed resistors while they are still in a wet state by pressing against the exposed surface thereof.

8. A printing apparatus as claimed in claim 7, wherein the surface of the roller of said surface treating device which rolls against the printed resistors is coated with a liquid which does not dissolve the binder composition of said printing ink and evaporates easily without any bad effect after curing of the printed resistors.

9. A printing apparatus as claimed in claim 1, wherein the conveyor moving in said furnace is chain conveyor and is provided with a plurality of pallets for supporting the printed sheets in precise positions, said pallets having projections on which the sheets are placed for uniform heating.

10. A printing apparatus as claimed in claim 1, wherein said heating furnace is a tunnel type furnace having means for producing a temperature distribution which is uniform with respect to a direction transverse to a transportation direction.

11. A printing apparatus as claimed in claim 1, further comprising an ink homogenizing device positioned between said ink roller and said ink supply means, which ink homogenizing device comprises kneading rollers for achieving a uniform thickness of the ink for printing the printed resistors.

12. A printing apparatus as claimed in claim 11, wherein said ink homogenizing device comprises a ductor roller which contacts a fountain roller in said ink supply means, a first kneading roller which contacts the ductor roller and moves alternately toward the opposite ends of said ductor roller in the axial direction thereof, a second kneading roller which contacts said first roller, and a third kneading roller which contacts said second kneading roller and said ink roller of the rotary offset press and which moves alternately toward the opposite ends of said second kneading roller in the axial direction thereof, the axial length of said second roller being equal to the sum of the length of a printing pattern parallel to the axial length of said roller and the distance said first kneading roller moves.

13. A printing apparatus as claimed in claim 1, wherein said automatic ink supply control device comprises means for controlling the amount of ink supplied by adjusting automatically the speed of rotation of said fountain roller by the electric signal transmitted from said resistance inspection device through said automatic resistance controller when finished resistors have a resistance which deviates from a predetermined value.

14. A printing apparatus as claimed in claim 1, further including an automatic resistance recorder electrically connected to said resistance inspection device for mounting the whole printing system and an automatic resistance sorting device connected to said resistance inspection device which facilitates automatic collecting of acceptable resistors.

15. A printing apparatus as claimed in claim 14, wherein said resistance sorting device includes a collecting box for sheets having resistors printed thereon, said collecting box having means to classify the printed sheets into two groups of sheets, one group having a resistance within a predetermined tolerance and tthe other group of sheets having no predetermined resistance, said resistance sorting device collecting the former group.

References Cited

UNITED STATES PATENTS

| | | | |
|---|---|---|---|
| 1,989,976 | 2/1939 | Fuller | 101—2 |
| 2,545,539 | 3/1951 | Belluche et al. | 118—8 |
| 2,775,952 | 1/1957 | Schur | 118—8 |
| 2,816,523 | 12/1957 | Johnson | 118—8 |
| 2,868,157 | 1/1959 | Augery et al. | 118—8 |
| 2,906,196 | 9/1959 | Ritzerfeld et al. | 101—2 |
| 2,942,352 | 6/1960 | Eichen-Estienne | 118—6 |
| 3,065,350 | 11/1962 | Graner | 118—9 XR |
| 3,229,660 | 1/1966 | McLucas et al. | 118—8 |
| 3,289,835 | 12/1966 | Dalin | 101—2 XR |
| 3,290,167 | 12/1966 | Wood et al. | 118—8 XR |

CHARLES A. WILLMUTH, *Primary Examiner.*

ROBERT SMITH, *Assistant Examiner.*